US010959003B2

(12) United States Patent
Sly et al.

(10) Patent No.: US 10,959,003 B2
(45) Date of Patent: Mar. 23, 2021

(54) AIRCRAFT GROUND SAFETY FOR ULTRASONIC SENSORS

(71) Applicant: Rosemount Aerospace Inc., Burnsville, MN (US)

(72) Inventors: Jaime Sly, Savage, MN (US); Joshua Boelman, Farmington, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 355 days.

(21) Appl. No.: 16/034,830

(22) Filed: Jul. 13, 2018

(65) Prior Publication Data

US 2020/0021902 A1  Jan. 16, 2020

(51) Int. Cl.
| | |
|---|---|
| *H04R 1/08* | (2006.01) |
| *H04R 1/40* | (2006.01) |
| *H04R 1/04* | (2006.01) |
| *H04R 3/00* | (2006.01) |

(52) U.S. Cl.
CPC ............... *H04R 1/083* (2013.01); *H04R 1/04* (2013.01); *H04R 1/406* (2013.01); *H04R 3/005* (2013.01); *H04R 2499/13* (2013.01)

(58) Field of Classification Search
CPC .......... H04R 1/083; H04R 1/04; H04R 1/406; H04R 3/005; H04R 2499/13; G01S 15/003; G01S 15/04; G01S 15/60; G01S 15/88; G01S 7/52004; G01S 7/521; G01S 7/524; G01P 13/025; G01P 5/24; G10K 11/28; G01N 29/02; G01N 29/07; G01N 29/346; G01N 29/4427; G01N 29/48; B64D 43/02

See application file for complete search history.

(56) References Cited

U.S. PATENT DOCUMENTS

| | | | |
|---|---|---|---|
| 4,143,548 A | 3/1979 | Graewe et al. | |
| 4,719,605 A * | 1/1988 | Eder | ................ G01N 29/30 |
| | | | 367/151 |
| 9,467,769 B2 | 10/2016 | Liu et al. | |
| 9,848,269 B2 | 12/2017 | Eberbach et al. | |
| 2005/0244013 A1 | 11/2005 | Battenberg et al. | |
| 2006/0140415 A1 | 6/2006 | Haussmann | |
| 2012/0308043 A1 | 12/2012 | Hochleitner | |
| 2014/0062756 A1 | 3/2014 | Lamkin et al. | |
| 2015/0350799 A1 | 12/2015 | Schnarre et al. | |
| 2020/0018838 A1 * | 1/2020 | Sly | ................ G01N 29/48 |
| 2020/0021902 A1 * | 1/2020 | Sly | ................ H04R 1/04 |

FOREIGN PATENT DOCUMENTS

| | | | | |
|---|---|---|---|---|
| BR | 102019013615 A2 * | 4/2020 | ............ | G01S 15/60 |
| CA | 3048692 A1 * | 1/2020 | ............ | H04R 1/083 |
| EP | 3594938 A1 * | 1/2020 | ............ | H04R 1/04 |

OTHER PUBLICATIONS

Extended European Search Report EP Application No. 19185819.0, dated Dec. 9, 2019, pp. 8.

* cited by examiner

*Primary Examiner* — Daniel Pihulic

(74) *Attorney, Agent, or Firm* — Kinney & Lange, P. A.

(57) ABSTRACT

An acoustic sensor system for an aircraft includes a transmitter configured to emit acoustic signals external to the aircraft, and at least one microphone positioned on an exterior of the aircraft and configured to sense the acoustic signals as sensed data. The acoustic sensor system is configured to direct the acoustic signals to the at least one microphone such that a sound pressure level is attenuated perpendicular to the aircraft.

20 Claims, 4 Drawing Sheets

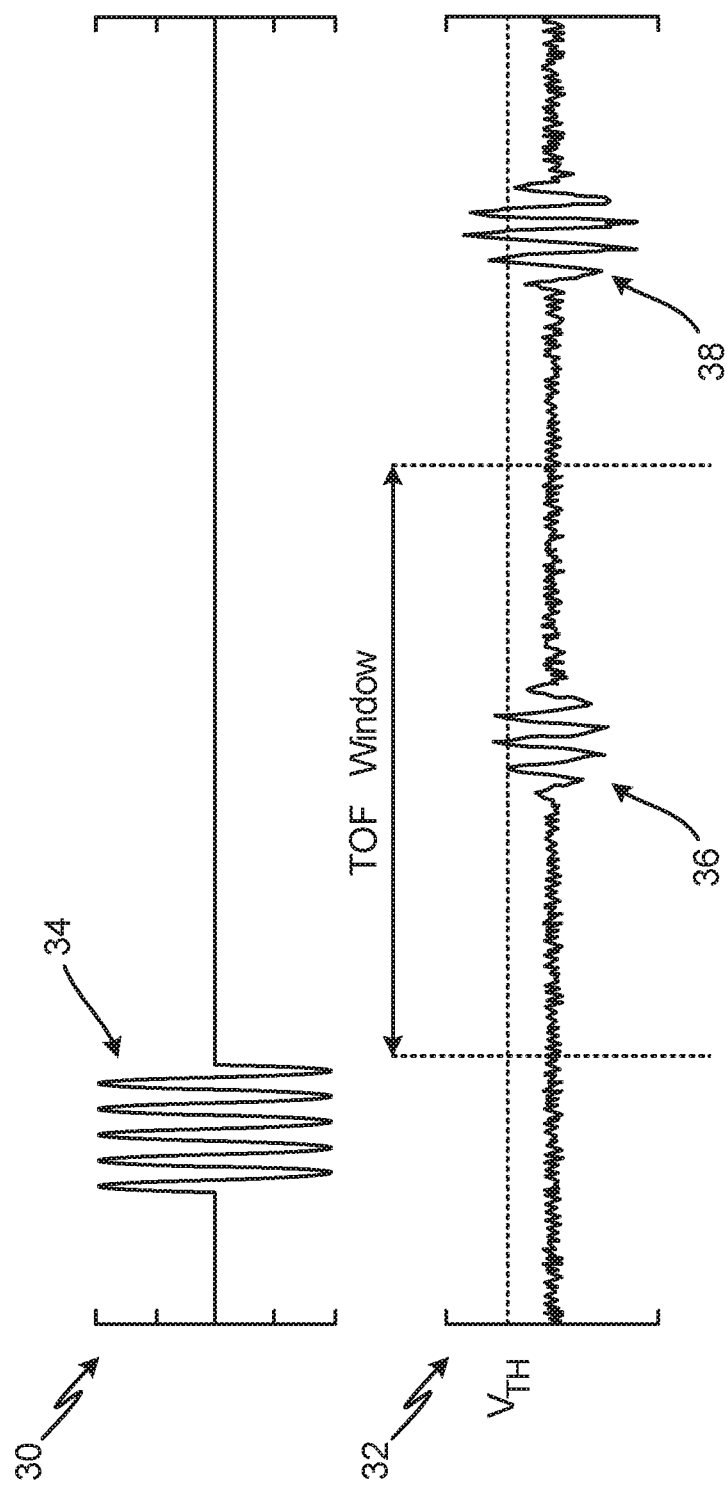

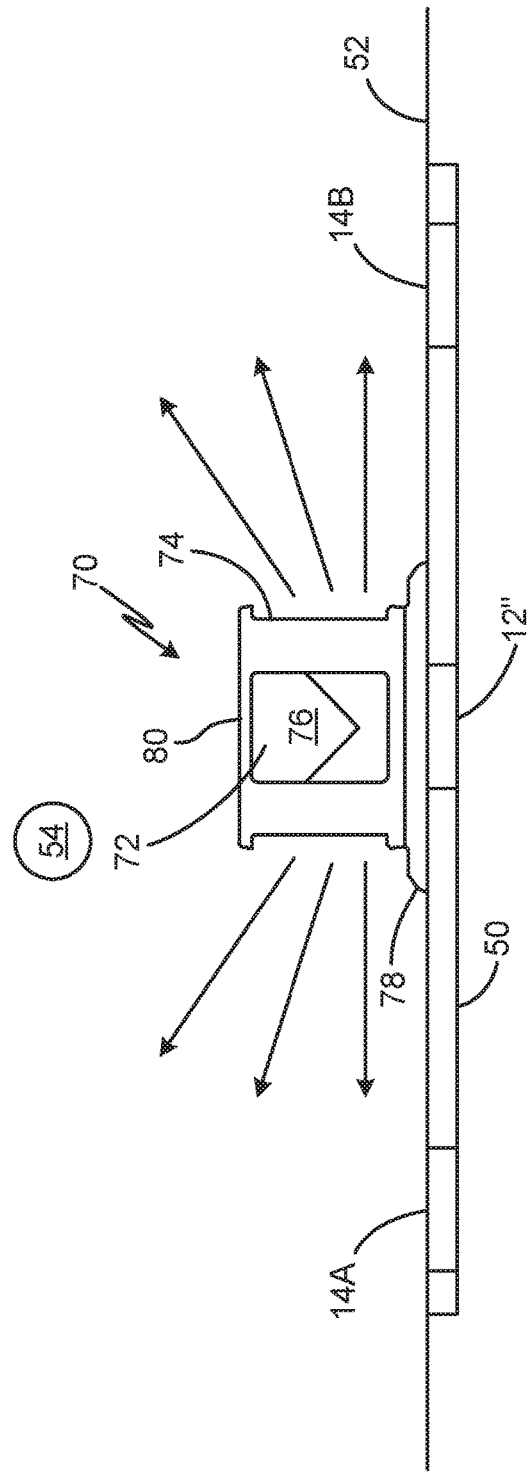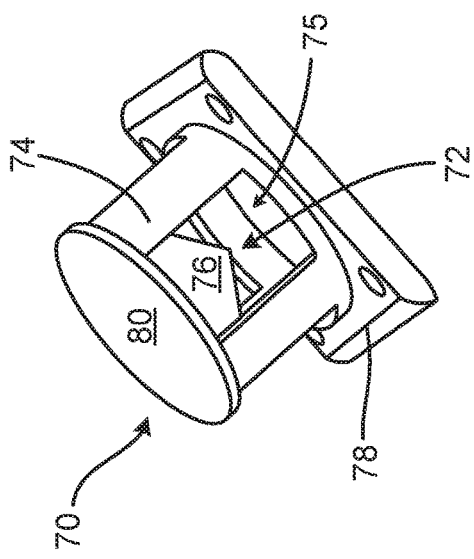
Fig. 4A
Fig. 4B

AIRCRAFT GROUND SAFETY FOR ULTRASONIC SENSORS

BACKGROUND

The present disclosure relates generally to acoustic sensors, and more particularly to ground safety for aircraft ultrasonic acoustic sensors.

It is desirable to ensure hearing safety of ground crew, maintenance personnel, or other persons near an aircraft that includes high decibel (dB) ultrasonic sound transmitters. Hearing safety can be a concern at high sound pressure levels, including those over 155 dB, for example, even with the use of hearing protection. In addition to hearing safety, other undesirable physiological effects can occur due to high decibel ultrasonic sound at lower levels, such as 130 dB, for example. These levels may be desirable in an aircraft sensing system to support high velocity measurements.

For systems that are critical to the operation of the aircraft, it may be impractical to simply turn the ultrasonic transmitters off while the aircraft is on the ground. Critical systems may need to provide, for example, power-up built-in-test results demonstrating that the system is functional prior to flight and may also need to begin providing preliminary measurement data to support maintenance, taxi, and takeoff operations. Thus, it is desirable to allow ultrasonic acoustic systems to begin operation and performance of fault checking while the aircraft is on the ground.

SUMMARY

An acoustic sensor system for an aircraft includes a transmitter configured to emit acoustic signals external to the aircraft, and at least one microphone positioned on an exterior of the aircraft and configured to sense the acoustic signals as sensed data. The acoustic sensor system is configured to direct the acoustic signals to the at least one microphone such that a sound pressure level is attenuated perpendicular to the aircraft.

A method of controlling the directivity of acoustic signals of an acoustic sensor system includes emitting, by a transmitter of the acoustic sensor system, the acoustic signals about an exterior of an aircraft; and directing, by the acoustic sensor system, the acoustic signals toward at least one microphone of the acoustic sensor such that a sound pressure level is attenuated perpendicular to the aircraft.

A fixed echo protector for attachment to an acoustic sensor includes a housing and a directivity feature positioned within the housing. The housing extends from a base to an end, and is configured to attach to the acoustic sensor over an acoustic transmitter. The base includes an opening to permit acoustic signals from the acoustic transmitter to travel therethrough. The directivity feature is positioned within the housing above the opening and configured to direct the acoustic signals to at least one microphone such that a sound pressure level is attenuated perpendicular to the aircraft.

BRIEF DESCRIPTION OF THE DRAWINGS

FIG. 2 is a signal diagram illustrating example signals in an acoustic sensor system.

FIGS. 4A and 4B are schematic diagrams illustrating a fixed echo acoustic sensor system.

DETAILED DESCRIPTION

Systems and methods are disclosed herein for ground operation safety of aircraft ultrasonic sensors. In some example embodiments, a control circuit monitors the acoustic response from microphones of the ultrasonic sensors and/or monitors aircraft parameters from other systems onboard the aircraft in order to detect an environmental condition. In one embodiment, the control circuit may detect that the aircraft is on the ground and reduce the intensity of the emitted acoustic signals to below 110 decibels (dB), for example. In another embodiment, the control circuit may detect a hard target, which may be indicative of a person, in the vicinity of the ultrasonic sensor by detecting an echo of an emitted acoustic pulse. In response to the detected hard target, the control circuit may terminate the acoustic signals or reduce the intensity of the acoustic signals.

In other example embodiments, the directivity of the emitted acoustic signals may be controlled to limit the intensity of the emitted acoustic signals at a threshold distance from the aircraft. In one embodiment, the ultrasonic transmitter may be designed to emit the acoustic signals out horizontally along the skin of the aircraft toward the microphones of the ultrasonic sensor such that the sound pressure level is highly attenuated at a short distance from the skin of the aircraft, where a person is most likely to be. In another embodiment, a fixed echo protector may be placed over the ultrasonic transmitter that is configured to direct the acoustic signals horizontally along the skin of the aircraft such that the sound pressure level is also highly attenuated at a short distance from the skin of the aircraft.

Figure 1:
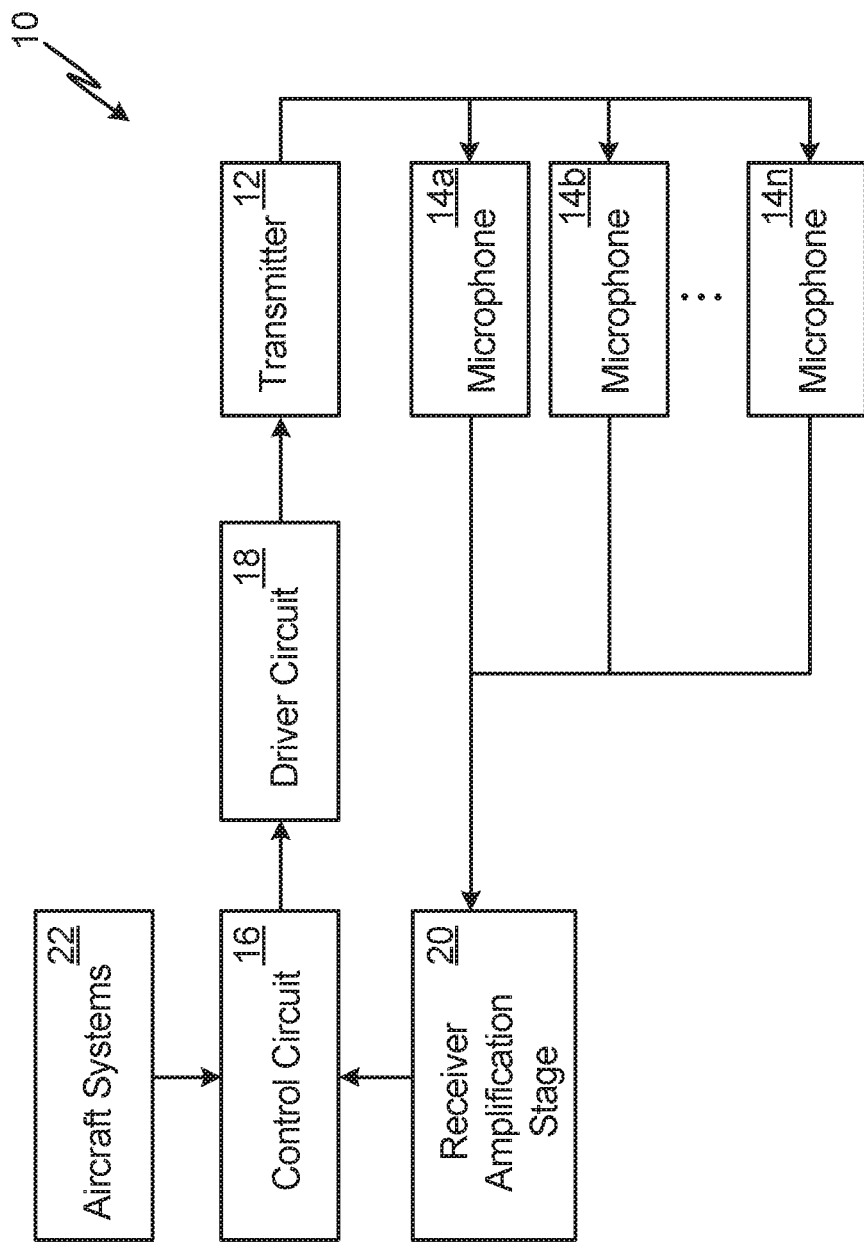
FIG. 1 is a block diagram illustrating a control loop for an acoustic sensor system.

FIG. 1 is a block diagram illustrating control loop 10 for an acoustic sensor system. Aircraft may employ acoustic sensor systems, for example, to determine air data parameters. These acoustic sensors may be placed on the exterior of the aircraft and may be utilized to determine, among other values, static air temperature, airspeed, angle of attack, and angle of sideslip. These air data parameters may be utilized by critical functions of the aircraft, such as flight control functions, which may make it necessary to test the acoustic sensor system while the aircraft is on the ground. While testing or performing maintenance, it is desirable that any persons in the vicinity of the acoustic sensors, such as ground personnel or maintenance personnel, do not experience any high sound pressure levels from the emitted acoustic signals.

Control loop 10 includes acoustic transmitter 12, microphones 14a-14n, control circuit 16, driver circuit 18, receiver amplification stage 20, and aircraft systems 22. Transmitter 12 is configured to emit acoustic signals into the air about the exterior of the aircraft. Microphones 14a-14n are positioned on the exterior of the aircraft to sense the acoustic signals emitted by transmitter 12. The sensed signals from microphones 14a-14n are amplified and conditioned by, receiver amplification stage 20 and provided to control circuit 16 for processing. Control circuit 16 may be a standalone controller or may be a part of a larger aircraft control system. Control circuit 16 may be located in close proximity to transmitter 12 and microphones 14a-14n, or may be located remote from transmitter 12 and microphones 14a-14n in an avionics or other electronics bay, for example.

Control circuit 16 is configured to control the output of the acoustic pulses through driver circuit 18. Control circuit 16 may include one or more of a microprocessor, application specific integrated circuit (ASIC), field-programmable gate array (FPGA), or other circuit. Driver circuit 18 may be any electronic circuit configured to control the output of transmitter 12 based on input from control circuit 16. For example, to increase the intensity of the acoustic signals, control circuit 16 can increase a control voltage provided by driver circuit 18. In one example embodiment, the acoustic signals may be acoustic pulses emitted at any desired frequency. For example, acoustic sensor system 10 may be an ultrasonic acoustic sensor system, configured to emit acoustic pulses at greater than 20 kHz. In other embodiments, acoustic sensor system 10 may be configured to emit a continuous sound wave rather than pulses.

Control circuit 16 may control transmitter 12 to emit signals at a desired intensity using closed-loop feedback control. Control circuit 16 can monitor the response from microphones 14a-14n to determine a present intensity of emitted signals. This way, if control circuit 16 desires transmitter 12 to emit a signal at a desired intensity, control circuit 16 can monitor the response from microphones 14a-14n to determine a present intensity and continue to adjust the voltage provided by driver circuit 18 until the response from microphones 14a-14n indicate that the present intensity is at the desired intensity.

With continued reference to FIG. 1, FIG. 2 is a signal diagram illustrating signals produced and received by an aircraft acoustic sensor system. Signal 30 is a signal indicative of an acoustic signal emitted by transmitter 12, and signal 32 is a signal indicative of an acoustic signal received by one of microphones 14a-14n. For example, signal 30 may be a voltage provided by driver circuit 18 and signal 32 may be a voltage received from one or more of microphones 14a-14n indicative of a sensed acoustic signal.

Pulse 34 is representative of an acoustic pulse emitted by transmitter 12. During flight of an aircraft, pulse 34 may be at or about 140 dB and greater than 25 kHz in order to ensure integrity of data throughout the flight envelope. Pulse 34 is sensed at microphones 14a-14n as pulse 36. The distance between transmitter 12 and microphones 14a-14n is known and thus, the timing of pulse 36 is utilized by control circuit 16 to determine air data parameters, for example. However, regardless of environmental conditions, pulse 36 is expected to be sensed by microphones 14a-14n within an expected time-of-flight (TOF) window, which may be on the order of 500 microseconds, for example. The above factors, in addition to the flight envelope, can be utilized to determine a desired TOF window, for example.

The amplitude of pulse 34 is indicative of the sound pressure level of the acoustic signal at the respective microphone 14a-14n. A voltage threshold may be set and utilized to differentiate a pulse 36 from background noise. Depending upon the conditions of the environment, the sound pressure level of the emitted acoustic signal may need to be sufficiently high in order to ensure detection of pulses 36 at microphones 14a-14n and in turn, ensure the integrity of the air data parameters determined by the acoustic sensor system.

It may be desirable to operate in a low-decibel mode while the aircraft is on the ground. For example, it may be desirable to limit the intensity of the emitted acoustic signals to less than 110 dB to ensure hearing safety for any persons present in the vicinity of transmitter 12. Control circuit 16 may determine that the aircraft is on the ground based on parameters received from aircraft systems 20, for example. The parameters received may include, among others, weight-on-wheels (WOW), throttle position, or other aircraft parameters desired by control circuit 16. In one embodiment, control circuit 16 may control transmitter 12 to emit signals at the reduced intensity any time the WOW parameter indicates the aircraft is on the ground. In another embodiment, control circuit 16 may also monitor the throttle position to determine both that the aircraft is on the ground, and that the aircraft is not accelerating down the runway. This is due to the fact that persons are unlikely to be in the vicinity of transmitter 12 while the aircraft is accelerating down the runway.

Control circuit 16 may control the intensity of the acoustic signals using a closed-loop control. For example, control circuit 16 can monitor the amplitude of pulse 36 to determine a present intensity of emitted acoustic signals (e.g., pulse 36). If the amplitude of pulse 36 indicates that the intensity of acoustic signals emitted by transmitter 12 is below 110 dB, control circuit 16 can maintain the voltage provided by drive circuit 18. If the amplitude of pulse 36 indicates that the intensity of acoustic signals emitted by transmitter 12 is above 110 dB, control circuit 16 can reduce the voltage provided by drive circuit 18 to further reduce the intensity of the emitted pulses, until the present intensity reaches the desired value.

Control circuit 16 may also be configured to monitor for a hard target in close proximity to transmitter 12. Pulse 38 is an unexpected pulse with respect to emitted pulse 34 as it occurs outside the expected TOF window. Pulse 38 may be indicative of a hard target in that the emitted pulse 34 reflected off of the hard target back toward microphones 14a-14n. A threshold ($V_{TH}$) may be set with which control circuit 16 compares signal 32 in order to detect a hard target pulse 38 outside of the TOF window.

The threshold ($V_{TH}$) for detecting a hard target (e.g., pulse 38) may be set as the same value that control circuit 16 uses to detect an expected pulse (e.g., pulse 36). In other embodiments, a separate threshold ($V_{TH}$) may be set for detecting a hard object that takes into account, for example, an assumed safe distance and ambient parameters for atmospheric attenuation. For example, if a hard target is greater than 20 feet from transmitter 12, acoustic signals may be attenuated sufficiently such that control circuit 16 does not need to adjust the output of transmitter 12. The threshold ($V_{TH}$) could thus be set to ignore pulses that correspond to hard targets that are 20 feet, or any other safe distance, from transmitter 12.

Detection of pulse 38, which may be indicative of the presence of a hard target, may instruct control circuit 16 to reduce the intensity of the acoustic signal emitted by transmitter 12. For example, if transmitter 12 is currently emitting acoustic signals at greater than 110 dB, control circuit 16 may reduce the voltage provided by driver circuit 18 to decrease the intensity of the acoustic signals to below 110 dB. In other embodiments, upon detection of pulse 38, control circuit 16 may simply command transmitter 12 off by terminating power to driver circuit 18.

By reducing the emitted signal to less than 110 dB, the acoustic sensor system can still operate on the ground while reducing the exposure to any persons in the vicinity of the acoustic sensor system. While lowering the output intensity may increase the signal-to-noise ratio, which can limit performance, the performance may be sufficient to sense air data parameters or perform testing and/or maintenance while on the ground in low/zero speed conditions, for example.

Figure 3A:
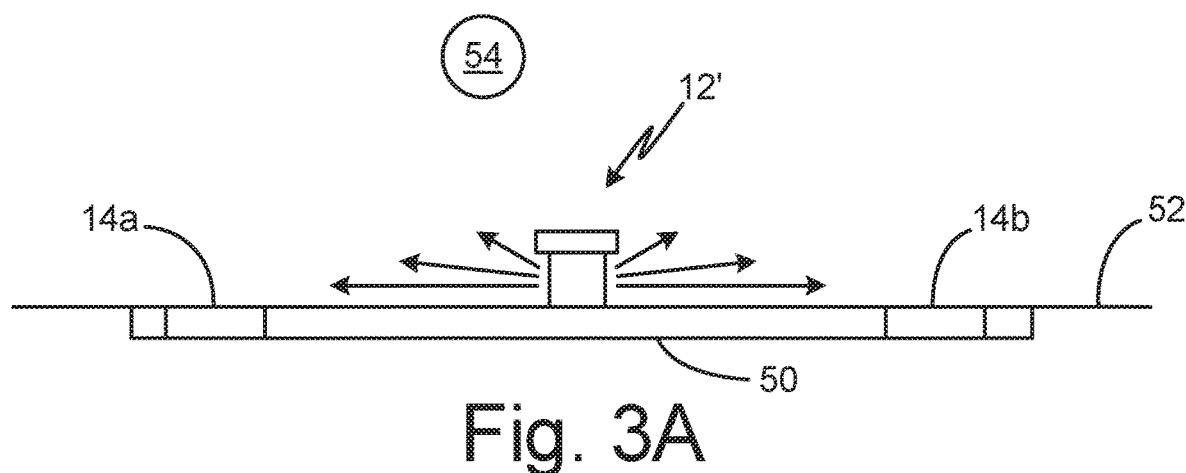
FIG. 3A is a schematic diagram of an acoustic sensor system.
Figure 3B:
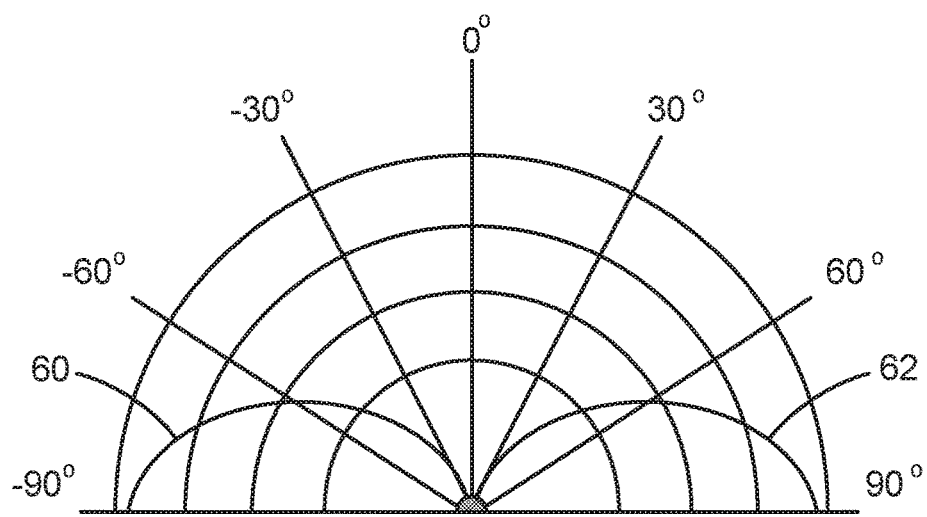
FIG. 3B is a polar plot for an acoustic sensor system.

FIG. 3A is a schematic diagram of an acoustic sensor system and FIG. 3B is a polar plot for an acoustic sensor system. Rather than controlling an acoustic transmitter to reduce the intensity of emitted acoustic signals, the directivity of a transmitter may be controlled to ensure that while the sound pressure level at the microphones is high, the sound pressure level at a short distance from the body of the aircraft, perpendicular to the transmitter, is sufficiently attenuated. For example, hard target 54, which may be a person outside of an aircraft, is positioned at a short distance perpendicular to the acoustic sensor system of aircraft 52. The directivity of transmitter 12' may be designed such that the sound pressure level present at hard target 54 is sufficiently attenuated while the sound pressure level at microphones 14a-14n is sufficiently high.

In one embodiment, as illustrated in FIG. 3A, transmitter 12' may include a cylindrical piezo material configured to vibrate to emit acoustic signals into the airflow external to aircraft 52. Microphones 14a and 14b are positioned within plate 50 to sense the acoustic signals emitted by transmitter 12'. For example, the cylindrical piezo material may be configured to extend out from the skin of aircraft 52 in order to emit the acoustic signals horizontally along the skin of the aircraft as illustrated in the polar plot of FIG. 3B. In the polar plot illustrated in FIG. 3B, Sound Pressure Levels (SPL) 60 and 62 illustrate the sound pressure emitted by transmitter 12'. As illustrated, the maximum SPL is out at an angle of 90°, which is where microphones 14a, and 14b are located on the exterior of aircraft 52, and is where persons will not be located.

While illustrated in FIG. 3A as a cylindrical piezo material transmitter, transmitter 12' may be designed in other ways to achieve the directivity illustrated in FIG. 3B. For example, a horn design may be used, or a plurality of low cost transmitters may be configured in an array that extend out from aircraft 52 and are pointed radially toward microphones 14a-14n. While not illustrated in the polar plot of FIG. 3B, these transmitter designs may also result in some lower intensity side lobes. By designing the acoustic sensor system to have the directivity illustrated in FIG. 3B, any exposure to high pressure sound levels by hard target 54 can be avoided.

FIGS. 4A and 4B are schematic diagrams illustrating fixed echo protector 70 for an acoustic sensor system. Fixed echo protector 70 acts as a "hat" for transmitter 12", which may be any type of acoustic transmitter configured to emit acoustic pulses external to aircraft 52. Fixed echo protector 70 includes a directivity feature configured to direct the acoustic signals to microphones 14a and 14b. In the embodiment illustrated in FIGS. 4A and 4B, the directivity feature is inverted pyramid 72, which is positioned within housing 74, above opening 75. Opening 75 permits acoustic signals to reach inverted pyramid 72 from transmitter 12". Inverted pyramid 72 includes one or more faces 76 positioned to direct acoustic signals out toward microphones 14a and 14b. Housing 74 extends from base 78 to opposite end 80.

The one or more faces 76 are flat faces that direct acoustic signals from transmitter 12" to each microphone 14a and 14b. Although not required, in the present embodiment, faces 76 may be flat rather than rounded so as not to affect the frequency response of the acoustic sensor system. Each microphone may include its own respective corresponding flat face 76. For example, if the acoustic sensor system includes four microphones, inverted pyramid 72 may include four respective faces 76. Each face 76 will direct acoustic signals from transmitter 12" to the respective microphone 14a-14n. This allows a directivity similar to that illustrated in FIG. 3B to be achieved with any special transmitter design. In other embodiments, the directivity feature may be an inverted cone, or any other structure configured to direct the acoustic signals to microphones 14a-14n.

In the embodiment illustrated in FIGS. 4A and 4B, inverted pyramid 72 has an angle between the apex of inverted pyramid 72 and base 80 that is sufficient to attenuate the emitted acoustic signals to safe levels. This angle may be 45°, for example, or any other angle sufficient to attenuate the sound pressure levels for hard target 54. For example, fixed echo protector 72 may direct acoustic signals emitted by transmitter 12" at 140 dB such that hard target 54 receives the acoustic signals at less than 110 dB. This way, ground operation can occur without the need to reduce the intensity of signals emitted by transmitter 12" as compared to in-flight use. In some embodiments, fixed echo protector 70 may be attached over transmitter 12" while the aircraft is on the ground and may be removed while the aircraft is in-flight. For example, fixed echo protector 70 may be attached over transmitter 12" during maintenance, and removed once maintenance is complete.

Discussion of Possible Embodiments

The following are non-exclusive descriptions of possible embodiments of the present invention.

An acoustic sensor system for an aircraft includes a transmitter configured to emit acoustic signals external to the aircraft, and at least one microphone positioned on an exterior of the aircraft and configured to sense the acoustic signals as sensed data. The acoustic sensor system is configured to direct the acoustic signals to the at least one microphone such that a sound pressure level is attenuated perpendicular to the aircraft.

The acoustic sensor system of the preceding paragraph can optionally include, additionally and/or alternatively, any one or more of the following features, configurations and/or additional components:

A further embodiment of the foregoing acoustic sensor system, further including an echo protector fixed over the transmitter and shaped to direct the acoustic signals such that the sound pressure level is attenuated perpendicular to the aircraft.

A further embodiment of any of the foregoing acoustic sensor system, wherein the echo protector includes a housing that extends from a base to an end, and a directivity feature positioned within the housing and configured to direct the acoustic signals to the at least one microphone.

A further embodiment of any of the foregoing acoustic sensor systems, wherein the base includes an opening configured to permit the acoustic signals to reach the directivity feature.

A further embodiment of any of the foregoing acoustic sensor systems, wherein the directivity feature is an inverted pyramid connected to the end of the housing, and wherein each of a plurality of faces of the inverted pyramid are positioned to direct the acoustic signals.

A further embodiment of any of the foregoing acoustic sensor systems, wherein the at least one microphone comprises a plurality of microphones, and wherein each of the plurality of faces is configured to direct the acoustic signals to a respective one of the plurality of microphones.

A further embodiment of any of the foregoing acoustic sensor systems, wherein the transmitter is configured to protrude beyond a skin of the aircraft and emit the acoustic signals toward the at least one microphone such that the sound pressure level is maximized at the at least one microphone and minimized perpendicular to the aircraft.

A further embodiment of any of the foregoing acoustic sensor systems, wherein the transmitter is configured to emit the acoustic signals as ultrasonic signals.

A method of controlling the directivity of acoustic signals of an acoustic sensor system includes emitting, by a transmitter of the acoustic sensor system, the acoustic signals about an exterior of an aircraft; and directing, by the acoustic sensor system, the acoustic signals toward at least one microphone of the acoustic sensor system such that a sound pressure level is attenuated perpendicular to the aircraft.

The method of the preceding paragraph can optionally include, additionally and/or alternatively, any one or more of the following features, configurations and/or additional components:

A further embodiment of the foregoing method, wherein directing, by the structure of the acoustic sensor, the acoustic signals toward the at least one microphone includes directing, using an echo protector fixed over the transmitter, the acoustic signals such that the sound pressure level is attenuated perpendicular to the aircraft.

A further embodiment of any of the foregoing methods, wherein directing, using the echo protector fixed over the transmitter, the acoustic signals includes directing, by a directivity feature positioned within a housing of the echo protector, the acoustic signals.

A further embodiment of any of the foregoing methods, wherein directing, by the directivity feature positioned within a housing of the echo protector includes permitting the acoustic signals to reach the directivity feature from the transmitter through an opening in a base of the housing.

A further embodiment of any of the foregoing methods, wherein directing, by the directivity feature includes directing, by an inverted pyramid positioned within the housing, the acoustic signals, wherein the inverted pyramid includes a plurality of faces positioned to direct the acoustic signals.

A further embodiment of any of the foregoing methods, wherein the at least one microphone includes a plurality of microphones, and wherein directing, by the inverted pyramid positioned within the housing of the echo protector, the acoustic signals includes directing, by each one of the plurality of faces of the inverted pyramid, the acoustic signals to a respective one of the plurality of microphones.

A further embodiment of any of the foregoing methods, wherein the transmitter protrudes beyond the exterior of the aircraft, and wherein emitting, by the transmitter of the acoustic sensor, the acoustic signals about the exterior of the aircraft includes emitting, by the transmitter, the acoustic signals toward the at least one microphone such that the sound pressure level is attenuated perpendicular to the aircraft.

A further embodiment of any of the foregoing methods, wherein emitting, by the transmitter of the acoustic sensor, the acoustic signals comprises emitting the acoustic signals as ultrasonic signals.

A fixed echo protector for attachment to an acoustic sensor includes a housing and a directivity feature positioned within the housing. The housing extends from a base to an end, and is configured to attach to the acoustic sensor over an acoustic transmitter. The base includes an opening to permit acoustic signals from the acoustic transmitter to travel therethrough. The directivity feature is positioned within the housing above the opening and configured to direct the acoustic signals to at least one microphone such that a sound pressure level is attenuated perpendicular to the aircraft.

The fixed echo protector of the preceding paragraph can optionally include, additionally and/or alternatively, any one or more of the following features, configurations and/or additional components:

A further embodiment of the foregoing fixed echo protector, wherein the directivity feature is an inverted pyramid positioned within the housing above the opening in the base of the housing, and wherein the inverted pyramid includes a plurality of faces positioned to direct the acoustic signals to at least one microphone of the acoustic sensor.

A further embodiment of any of the foregoing fixed echo protectors, wherein the at least one microphone comprises a plurality of microphones, and wherein each of the plurality of faces is configured to direct the acoustic signals to a respective one of the plurality of microphones.

A further embodiment of any of the foregoing fixed echo protectors, wherein the acoustic signals comprise ultrasonic signals.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An acoustic sensor system for an aircraft, the acoustic sensor system comprising:
   a transmitter configured to emit acoustic signals external to the aircraft; and
   at least one microphone positioned on an exterior of the aircraft and configured to sense the acoustic signals as sensed data;
   wherein the acoustic sensor system is configured to direct the acoustic signals toward the at least one microphone such that a sound pressure level is attenuated perpendicular to the aircraft.

2. The acoustic sensor system of claim 1, further comprising:
   an echo protector fixed over the transmitter and shaped to direct the acoustic signals toward the at least one microphone such that the sound pressure level is attenuated perpendicular to the aircraft.

3. The acoustic sensor system of claim 2, wherein the echo protector comprises:
   a housing that extends from a base to an end; and
   a directivity feature positioned within the housing and configured to direct the acoustic signals to the at least one microphone.

4. The acoustic sensor system of claim 3, wherein the base includes an opening configured to permit the acoustic signals to reach the directivity feature.

5. The acoustic sensor system of claim 4, wherein the directivity feature is an inverted pyramid connected to the end of the housing, and wherein each of a plurality of faces of the inverted pyramid are positioned to direct the acoustic signals.

6. The acoustic sensor system of claim 5, wherein the at least one microphone comprises a plurality of microphones, and wherein each of the plurality of faces is configured to direct the acoustic signals to a respective one of the plurality of microphones.

7. The acoustic sensor system of claim 1, wherein the transmitter is configured to protrude beyond a skin of the aircraft and emit the acoustic signals toward the at least one microphone such that the sound pressure level is attenuated perpendicular to the aircraft.

8. The acoustic sensor system of claim 1, wherein the transmitter is configured to emit the acoustic signals as ultrasonic signals.

9. A method of controlling the directivity of acoustic signals of an acoustic sensor system, the method comprising:
  emitting, by a transmitter of the acoustic sensor, the acoustic signals about an exterior of an aircraft; and
  directing, by the acoustic sensor system, the acoustic signals toward at least one microphone of the acoustic sensor such that a sound pressure level is attenuated perpendicular to the aircraft.

10. The method of claim 9, wherein directing, by the acoustic sensor system, the acoustic signals toward the at least one microphone comprises directing, using an echo protector fixed over the transmitter, the acoustic signals toward the at least one microphone.

11. The method of claim 10, wherein directing, using the echo protector fixed over the transmitter, the acoustic signals comprises directing, by a directivity feature positioned within a housing of the echo protector, the acoustic signals.

12. The method of claim 11, wherein directing, by the directivity feature positioned within a housing of the echo protector comprises permitting the acoustic signals to reach the directivity feature from the transmitter through an opening in a base of the housing.

13. The method of claim 11, wherein directing, by the directivity feature comprises directing, by an inverted pyramid positioned within the housing, the acoustic signals, wherein the inverted pyramid includes a plurality of faces positioned to direct the acoustic signals.

14. The method of claim 13, wherein the at least one microphone comprises a plurality of microphones, and wherein directing, by the inverted pyramid positioned within the housing of the echo protector, the acoustic signals comprises directing, by each one of the plurality of faces of the inverted pyramid, the acoustic signals to a respective one of the plurality of microphones.

15. The method of claim 9, wherein the transmitter protrudes beyond the exterior of the aircraft, and wherein emitting, by the transmitter of the acoustic sensor, the acoustic signals about the exterior of the aircraft comprises emitting, by the transmitter, the acoustic signals toward the at least one microphone such that the sound pressure level is attenuated perpendicular to the aircraft.

16. The method of claim 9, wherein emitting, by the transmitter of the acoustic sensor, the acoustic signals comprises emitting the acoustic signals as ultrasonic signals.

17. A fixed echo protector for attachment to an acoustic sensor on an aircraft, the fixed echo protector comprising:
  a housing extending from a base to an end, wherein the base is configured to attach to the acoustic sensor over an acoustic transmitter, and wherein the base includes an opening to permit acoustic signals from the acoustic transmitter to travel therethrough, wherein the acoustic transmitter is configured to emit acoustic signals external to the aircraft; and
  a directivity feature positioned within the housing above the opening and configured to direct the acoustic signals to at least one microphone positioned on an exterior of the aircraft such that a sound pressure level is attenuated perpendicular to the aircraft and the acoustic sensor, wherein the at least one microphone is configured to sense the acoustic signals a sensed data.

18. The fixed echo protector of claim 17, wherein the directivity feature is an inverted pyramid positioned within the housing above the opening in the base of the housing, and wherein the inverted pyramid includes a plurality of faces positioned to direct the acoustic signals to at least one microphone of the acoustic sensor.

19. The fixed echo protector of claim 18, wherein the at least one microphone comprises a plurality of microphones, and wherein each of the plurality of faces is configured to direct the acoustic signals to a respective one of the plurality of microphones.

20. The fixed echo protector of claim 17, wherein the acoustic signals comprise ultrasonic signals.

* * * * *